United States Patent
Mokdad et al.

(10) Patent No.: US 9,970,574 B2
(45) Date of Patent: May 15, 2018

(54) MULTILAYER SYSTEM

(71) Applicant: SABIC Global Technologies B.V., Bergen op Zoom (NL)

(72) Inventors: Abdulhamid Mokdad, Riyadh (SA); Mohamed Zerfa, Riyadh (SA)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days. days.

(21) Appl. No.: 15/313,628

(22) PCT Filed: May 18, 2015

(86) PCT No.: PCT/EP2015/060891
§ 371 (c)(1),
(2) Date: Nov. 23, 2016

(87) PCT Pub. No.: WO2015/177090
PCT Pub. Date: Nov. 26, 2015

(65) Prior Publication Data
US 2017/0211725 A1    Jul. 27, 2017

(30) Foreign Application Priority Data
May 23, 2014 (EP) .................................... 14169557

(51) Int. Cl.
| | |
|---|---|
| *F16L 9/12* | (2006.01) |
| *B32B 1/08* | (2006.01) |
| *B32B 27/08* | (2006.01) |
| *B32B 27/32* | (2006.01) |
| *B32B 27/30* | (2006.01) |
| *B32B 7/10* | (2006.01) |

(52) U.S. Cl.
CPC .................................... *F16L 9/12* (2013.01); *B32B 1/08* (2013.01); *B32B 7/10* (2013.01); *B32B 27/08* (2013.01); *B32B 27/304* (2013.01); *B32B 27/308* (2013.01); *B32B 27/32* (2013.01); *B32B 2250/246* (2013.01); *B32B 2250/42* (2013.01); *B32B 2307/7242* (2013.01); *B32B 2597/00* (2013.01)

(58) Field of Classification Search
CPC ... F16L 9/12; B32B 1/08; B32B 27/08; B32B 27/32; B32B 27/304; B32B 27/308; B32B 7/10; B32B 2250/42; B32B 2307/7242; B32B 2250/246; B32B 2597/00
See application file for complete search history.

(56) References Cited

U.S. PATENT DOCUMENTS

| | | |
|---|---|---|
| 6,124,406 A | 9/2000 | Cinadr et al. |
| 2004/0028860 A1 | 2/2004 | Dalal et al. |

FOREIGN PATENT DOCUMENTS

| | | |
|---|---|---|
| EP | 1748241 A1 | 1/2007 |
| EP | 1818171 A1 | 8/2007 |
| WO | 2004058499 A1 | 7/2004 |

OTHER PUBLICATIONS

International Search Report of the International Searching Authority for International Application No. PCT/EP2015/060891; Date of Filing: May 18, 2015; dated Aug. 12, 2015; 4 Pages.
Wirtten Opinion of the International Searching Authority for International Application No. PCT/EP2015/060891; Date of Filing: May 18, 2015; dated Aug. 12, 2015; 6 Pages.

*Primary Examiner* — Michael C Miggins
(74) *Attorney, Agent, or Firm* — Cantor Colburn LLP

(57) ABSTRACT

The invention is directed to a multilayer system, and to an article comprising said multilayer system. The multilayer system of the invention comprises—one or more polyvinyl chloride layers; and—one or more polyolefin layers, wherein said one or more polyvinyl chloride layers comprise a copolymer containing one or more moieties that are miscible with polyvinylchloride and one or more epoxy groups, and wherein said one or more polyolefin layers comprise one or more polyolefins modified to have one or more carboxyl groups.

19 Claims, No Drawings

MULTILAYER SYSTEM

CROSS REFERENCE TO RELATED APPLICATIONS

This application is a 371 of International Application No. PCT/EP2015/060891, filed May 18, 2015, which claims priority to European Application No. 14169557.7, filed May 23, 2014, both of which are incorporated by reference in their entirety herein.

The invention is directed to a multilayer system, and to an article comprising said multilayer system. More in particular, the invention relates to a multilayer system comprising one or more polyvinyl chloride layers and one or more polyolefin layers.

Polyvinylchloride is widely used in diverse fields of application such as pipes for transporting liquids which may even be aggressive, food substances and gases seals, footwear or footwear components, films for food and non-food packaging, etc. Amongst the most appreciated features of polyvinylchloride are the fact that it can be painted and glued.

Polyolefins are apolar polymers used, among other things, for applications similar to those of polyvinylchloride.

In some applications the use of polymers specifically targeted to obtain particular technical effects is preferably. For example, for direct contact with drinking water or where a chemical or thermal resistance that cannot be guaranteed by polyvinylchloride is required, or for aesthetic reasons or to house inserts in technical components, etc. For these applications use can be made of polyolefins which cannot normally be painted or moulded or glued or sealed with polyvinylchloride, preventing the production of products composed of polymers of very different types, usually due to their polarity or apolarity.

Polyolefin piping is commonly used for cold (10-35° C.) water systems for potable water, irrigation at high pressure in the range from 650-1490 kPa, and drainage waste water. Various types of polyethylene can, for instance, be chosen (such as linear low density polyethylene, medium density polyethylene or high density polyethylene) depending on the conditions of usage of the pipe. Cross-linked polyethylene is typically used for domestic cold and hot water (11-115° C.) as well as in radiant heating applications. At temperatures above 100° C. and at relatively thigh pressures, the risk of pipe rupture increases for these materials. Further oxidising agents in water, such as chlorine and hypochlorous acid, can be damaging for the pipe and decrease the pipe lifetime.

Polyolefin piping is therefore often protected with antioxidants but is nevertheless susceptible to diffusion of oxygen and reaction with oxidising agents entering the polyolefin wall, both from fluid carried within the pipe and from the environment outside the pipe. To minimise diffusion of oxygen from the air into the pipe, the pipe is sometimes externally coated with a barrier layer of ethylene vinyl alcohol copolymer using an intermediate adhesive layer, but such ethylene vinyl alcohol copolymers are susceptible to cracking upon expansion. Adhesive is required because ethylene vinyl alcohol copolymer cannot be extruded over polyolefin pipe under conditions such that the contiguous ethylene vinyl alcohol copolymer and polyolefin surfaces are adequately self-adhered.

An alternative piping system which is essentially immune to degradation by oxidising agents and substantially impermeable to oxygen is available. Such pipe is made from either polyvinylchloride or chlorinated polyvinylchloride, the choice depending upon the temperature of the water and other criteria. But it is well known that advantages of a polyolefin piping system are not available in a polyvinylchloride and/or chlorinated polyvinylchloride piping system, and vice versa. Accordingly, much effort has been devoted to producing pipe which has the advantages of both systems and the drawbacks of neither. However, neither polyvinylchloride nor chlorinated polyvinylchloride is directly bondable to a polyolefin surface satisfactorily. Attempts have been made to provide an intermediate adhesive layer.

U.S. Pat. No. 6,124,406 discloses that a blocky chlorinated polyolefin may be used to compatibilise polyvinylchloride or chlorinated polyvinylchloride with a polyolefin rubber and that a blend of polyvinylchloride and/or chlorinated polyvinylchloride with blocky chlorinated polyethylene and a polyolefin rubber can have a combination of good impact resistance, high heat distortion temperature (relative to the base polyvinylchloride or chlorinated polyvinylchloride), good tensile properties, oxidation resistance, and stability to ultraviolet light exposure.

US-A-2004/0 028 860 describes a pipe having a polyolefinic outer layer and a core comprising a major proportion by weight of certain chlorinated poly(lower olefin), wherein the core is directly cohesively bonded to the outer layer's inner surface without an adhesive.

EP1748241A1 discloses a PVC tube having a friction-reducing layer applied to the inside. This friction-reducing layer consists of a material that can be applied with co-extrusion such that it bonds directly to the PVC material that is likewise extruded. The a friction-reducing layer preferably comprises an ethylene acrylate copolymer. This European patent application does not disclose a multilayer system wherein the layers contain components that chemically react so as to reinforce the bond between the layers.

WO 2004/058499 discloses a multi-layer polymer comprising (1) a first outer layer; (2) a second outer layer and (3) an adhesive tie layer between the two outer layers, wherein the first outer layer comprises a polar polymer, the second outer layer comprises a non-polar polymer, and the adhesive tie layer comprises (a) a copolyester elastomer that is totally or partially miscible with the polar polymer, (b) a non-polar polymer that is totally or partially miscible with the non-polar polymer in the second outer layer and (c) a copolymer that contains functional groups capable of reaction with the functional end groups of component (a) and that is totally or partially miscible with the non-polar polymer in the second outer layer. Contrary to the present invention this international patent application suggests the use of a tie layer between the polar and non-polar layers of the multi-layer composition.

EP 1818171 A1 discloses a printable laminate comprising (a) a base layer comprising at least one polymer; (b) a surface layer comprising an ethylene copolymer (b1) containing 1 to 50% by weight based on the ethylene copolymer, of one or more polar repeating units which are derived from ethylenically unsaturated monomers selected from the group consisting of carboxylic acid esters, carboxylic acids, carboxylic acid nhydrides, carboxylic acid salts, and epoxy compounds; and optionally (c) an adhesive layer between the base layer (a) and the surface layer (b); wherein at least one of layers (a), (b), (c) comprises a polymer (b2) which is grafted with at least one unsaturated carboxylic acid, unsaturated sulfonic acid and/or unsaturated carboxylic acid anhydride, and/or their salts.

It is not currently possible to stably couple a layer of polyethylene or polypropylene with a layer of polyvinylchloride. In the case of pipes, the need for a pipe composed of two or more layers of different types of polymers depends on the type of liquid or fluid which muss past inside it, the desired barrier effect features, the possibility of moulding or gluing required or the flexibility the pipe must have.

For example, it is not currently possible to produce a pipe with the inner layer made of polyethylene or polypropylene for the passage of drinking water or petrol and to cover it with an outer layer of polyvinylchloride. In general, when attempts are made to use co-extrusion, overextrusion or overmoulding to couple a polyvinylchloride with a polyolefin, no (or bad) adhesion is obtained due to the incompatibility of the different polymers.

In addition, chlorinated polyolefin (such as chlorinated polyethylene) is a material used in the formulation of polyvinylchloride as a shockproof additive and to improve the behaviour of the compound relative to cold. Moreover, chlorinated polyolefin is also used as a universal coupling agent in polyolefins or as a homogenising agent for scrap and waste from various types of plastic material.

An objective of the invention is to provide a solution to problems faced in the art with respect to the adhesion between polyvinylchloride layers and polyolefin layers.

The inventors found that this objective can, at least in part, be met by providing a multilayer system of polyvinylchloride and polyolefin, wherein the interaction between the different layers is improved by means of a chemical interaction at the interface.

Accordingly, in a first aspect the invention is directed to a multilayer system comprising
one or more polyvinylchloride layers, in contact with
one or more polyolefin layers,
wherein said one or more polyvinyl chloride layers comprise a copolymer containing one or more moieties that are miscible with polyvinylchloride and one or more epoxy groups, and
wherein said one or more polyolefin layers comprise one or more polyolefins modified to have one or more carboxyl groups.

The inventors surprisingly found that in the multilayer system of the invention the interfaces forces are reinforced through an in situ reaction between epoxy and carboxyl groups. As a result, the adhesion between the one or more polyvinylchloride layers and the one or more polyolefin layers is significant. Without wishing to be bound by any theory, it is believed that the considerably improvement in adhesion is a result of an increase of the interaction forces at the interfaces between the polyolefin and the polyvinylchloride.

In the multilayer system according to the present invention the one or more polyvinylchloride layers and one or more polyolefin layers are in direct contact with each other. Said in another way, the multilayer system according to the invention does not contain a layer, such as a tie layer or an adhesive layer, between a polyvinylchloride layer and a polyolefin layer.

The term "polyvinylchloride" as used in this application is meant to refer to both homopolymers of vinylchloride as well as co- and terpolymers of vinyl chloride with comonomers such as vinyl acetate, vinyl formate, alkyl vinyl ethers, ethylene, propylene, butylenes, vinylidene chloride, alkyl acrylates and alkyl methacrylates, alkyl maleates, alkyl fumarates, and the like. Preferably at least 80%, more preferably at least 90%, and even more preferably 100% of the monomers to be polymerised will be vinyl chloride monomer. These resins typically have a number average molecular weight of 35 000-120 000 g/mol as determined by ASTM D5296-97), preferably 45 000-75 000 g/mol. Inherent viscosity (as measured by ASTM D1243-60; Method A) will generally be in the range of 0.5-1.5, preferably in the range of 0.7-1.2. The method of preparation of these resins is not critical and, for example, any of the well known suspension techniques may be employed.

The term "polyolefin" as used in this application is well known to the skilled person and generally refers to a class of homopolymers or copolymers produced from one or more olefins (also called an alkene with the general formula CnH2n) as a monomer. Although strictly speaking not polyolefins, for the purpose of the present invention copolymers of ethylene and vinyl acetate (EVA), and copolymers of ethylene and vinyl alcohol (EVOH) are also considered as polyolefins. Ethylene/α-olefin copolymers are copolymers of ethylene with one or more comonomers selected from $C_3$-$C_{20}$ α-olefins, such as 1-butene, 1-pentene, 1-hexene, 1-octene, methyl pentene, and the like, including linear low density polyethylene (LLDPE), linear medium density polyethylene (MDPE), very low density polyethylene (VLDPE), and ultra low density polyethylene (ULDPE). Preferred polyolefins are polyethylene and polypropylene.

Polyolefins such as polyethylenes are commonly differentiated based on the density which results from their numbers of chain branches per 1000 carbon atoms in the polyethylene main chain in the molecular structure. Branches typically are $C_3$-$C_8$ olefins, and which are preferably butene, hexene or octene. For example, HDPE has very low numbers of short chain branches (less than 20 per 1000 carbon atoms), resulting in a relatively high density, i.e. a density of 0.94-0.97 gm/cc. LLDPE has more short chain branches, in the range of 20-60 per 1000 carbon atoms with a density of 0.91-0.93 gm/cc. LDPE with a density of 0.91-0.93 gm/cc has long chain branches (20-40 per 1000 carbon atoms) instead of short chain branches in LLDPE and HDPE. ULDPE has a higher concentration of short chain branches than LLDPE and HDPE, i.e. in the range of 80-250 per 1000 carbon atoms and has a density of 0.88-0.91 gm/cc.

Illustrative copolymer and terpolymers include copolymers and terpolymers of α-olefins with other olefins such as ethylene-propylene copolymers; ethylene-butene copolymers; ethylene-pentene copolymers; and ethylene-hexene copolymers. The above polyolefins may be obtained by any known process. The polyolefin may have a number average molecular weight of 1000-1 000 000 g/mol (as determined by ASTM D 6474-99), and preferably 10 000-500 000 g/mol. Preferred polyolefins are polyethylene, polypropylene, polybutylene and copolymers, and blends thereof. The most preferred polyolefin is polyethylene.

The one or more polyvinyl chloride layers comprise a copolymer containing one or more moieties that are miscible with polyvinylchloride and one or more epoxy groups. This copolymer in the polyvinylchloride layer interacts with the carboxyl groups in the polyolefin layer, thereby improving the adhesion between both.

The copolymer contains one or more moieties that are miscible with polyvinyl chloride. A preferred example of such a moiety is a polymethylmethacrylate, but other polar moieties that are readily miscible with polyvinylchloride can be used as well. Some other examples include nitrile butadiene rubber, polycaprolactone, polyethylene vinyl acetate, poly(ethylene-vinylacetate-carbon monoxide)terpolymer, and the like.

Further, the copolymer also contains one or more epoxy groups. Typically, such epoxy groups can be introduced into the copolymer by polymerising in the presence of epoxy group-containing monomers. For example, the epoxy group may be introduced in the form of a glycidyl ether group, a glycidyl ester group, a glycidylamino group, or a group derived from a reaction of an N-heterocycle-containing compound and epichlorohydrin as well as epoxy group, preferably in the form of a glycidyl ether or a glycidyl ester group. Some examples of such epoxy-group containing monomers include alkyl glycidyl ethers (such as vinyl glycidyl ether, isopropenyl glycidyl ether, allyl glycidyl ether, methallyl glycidyl ether, butenyl glycidyl ether and oleyl glycidyl ether), cycloalkyl glycidyl ethers, alkyl-substituted phenyl glycidyl ethers and derivatives thereof (such as 4-vinyl cyclohexyl-glycidyl ether, cyclohexenylmethyl glycidyl ether, o-allylphenyl glycidyl ether and p-vinylbenzyl glycidyl ether) the monoepoxide compounds of the diene type monomers (such as butadiene monoepoxide, chloroprene monoxide, 3,4-epoxy-1-pentene, 4,5-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinylcyclohexene and divinylbenzene monoxide) and alkyl glycidyl esters (such as glycidyl acrylate, glycidyl methacrylate, crotonic acid glycidyl ester and oleic acid glycidyl ester).

In the multilayer system of the invention one or more carboxyl groups of the modified polyolefin react in situ with one or more epoxy groups of the copolymer. Hence, in an embodiment one or more of the epoxy groups on the copolymer have undergone a ring-opening reaction with one or more carboxylic groups on the modified polyolefin. This reaction ensures excellent adhesion between the polyvinylchloride and polyolefin layers.

In a preferred embodiment, the copolymer comprises one or more monomers selected from the group consisting of methyl acrylate, methyl methacrylate, ethyl acrylate, ethyl methacrylate, glycidyl acrylate, and glycidyl methacrylate. More preferably, the copolymer comprise one or more monomers selected from methyl methacrylate, glycidyl methacrylate, ethyl acrylate. Even more preferably, the copolymer is a copolymer of methyl methacrylate, glycidyl methacrylate and ethyl acrylate.

In a preferred embodiment, the copolymer is a copolymer of methyl methacrylate, glycidyl methacrylate and ethyl acrylate, and the methyl methacrylate is present in an amount of 60-85 wt. % based on total weight of the copolymer, the glycidyl methacrylate is present in an amount of 10-40 wt. % based on total weight of the copolymer, and the ethyl acrylate is present in an amount of 1-5 wt. % based on total weight of the copolymer.

The relative amounts of the components in the various layers of the multilayer system can vary. The one or more polyvinyl chloride layers can for instance comprise
40-85 wt. % of said polyvinylchloride based on total weight of the one or more polyvinylchloride layers;
3-15 wt. % of said copolymer containing one or more moieties that are miscible with polyvinylchloride and one or more epoxy groups based on total weight of the one or more polyvinylchloride layers.

A more preferred example of the one or more polyvinyl chloride layers comprises:
45-80 wt. % of said polyvinylchloride based on total weight of the one or more polyvinylchloride layers;
4-12 wt. % of said copolymer containing one or more moieties that are miscible with polyvinylchloride and one or more epoxy groups based on total weight of the one or more polyvinylchloride layers.

The one or more polyolefin layers comprise one or more polyolefins modified to have one or more carboxyl groups (i.e. —COOH). Such modified polyolefins are commercially available. More in particular, the polyolefin that is modified to have one or more carboxyl groups suitably refers to those polymers obtained by modifying polyolefins with unsaturated carboxylic acids such as acrylic acid, methacrylic acid, maleic acid, fumaric acid, maleic anhydride, itaconic anhydride, etc. Such modified polyolefins can, for instance be obtained by a process of adding an unsaturated carboxylic acid (such as up to 5 mol %, preferably 0.5-2 mol %) and a slight quantity of an organic peroxide to a polyolefin, followed by melt-kneading the mixture by means of an extruder. These modifications are well-known in the art. Further, various polyolefins modified to have one or more carboxyl groups are commercially available. Some examples of commercially available modified polyolefins include Polybond® 1001, Polybond® 1002 and Polybond® 1009 (all available from Addivant).

In a preferred embodiment, the polyolefin modified to have one or more carboxyl groups is a modified polyethylene and/or modified polypropylene, preferably a modified high density polyethylene and/or modified polypropylene.

Apart from the one or more polyolefins modified to have one or more carboxyl groups, the one or more polyolefin layers can further comprise a unmodified polyolefin. Preferably, this further unmodified polyolefin is selected from a polyethylene and/or polypropylene, more preferably high density polyethylene, and/or polypropylene. Preferably such unmodified polyolefin is present in an amount of 40-85 wt. % based on total weight of the one or more polyolefin layers, more preferably 45-80 wt. %, even more preferably 50-75 wt. %.

Advantageously, the one or more polyvinyl chloride layers can further comprise a chlorinated polyolefin. While it is preferred that the chlorinated polyolefin is contained in the one or more polyvinyl chloride layers, it may in addition or alternatively be contained in the one or more polyolefin layers. The presence of such a chlorinated polyolefin further improves the mechanical properties of the multilayer system, in particular elongation to break. It is believed that this improvement is the result of a reduction of the surface tension between polyvinylchloride and polyolefin caused by the chlorinated polyolefin. The inventors found that the presence of a chlorinated polyolefin works synergistically with the improvement in mechanical properties by the copolymer compatibiliser. Preferably, such chlorinated polyolefin is present in an amount of 3-15 wt. % based on total weight of the one or more polyvinyl chloride layers, more preferably 4-12 wt. %, even more preferably 5-10 wt. %. Chlorinated polyolefins are commercially available, such as Tyrin™ BH 9000 which is available from Dow Chemical.

Preferably, the optional chlorinated polyolefin (E) is selected from a chlorinated polyethylene and/or chlorinated polypropylene. More preferably, the chlorinated polyolefin (E) is a chlorinated polyethylene.

The one or more polyolefin layers can for instance comprise
40-85 wt. % of unmodified polyolefin based on total weight of the one or more polyolefin layers;
3-15 wt. % of said one or more polyolefins modified to have one or more carboxyl groups based on total weight of the one or more polyolefin layers; and
3-15 wt. % of chlorinated polyolefin based on total weight of the one or more polyolefin layers.

A more preferred example of the one or more polyolefin layers comprises:
45-80 wt. % of unmodified polyolefin based on total weight of the one or more polyolefin layers;

4-12 wt. % of said one or more polyolefins modified to have one or more carboxyl groups based on total weight of the one or more polyolefin layers; and 4-12 wt. % of chlorinated polyolefin based on total weight of the one or more polyolefin layers.

The multilayers system of the invention can further comprise one or more additives (such as from 0.0001-20 wt. %, based on total weight of the multilayer). Such additives can, for example, include plasticisers, stabilisers including viscosity stabilisers and hydrolytic stabilisers, antioxidants, ultraviolet ray absorbers, anti-static agents, dyes, pigments or other colouring agents, inorganic fillers, fire-retardants, lubricants, reinforcing agents such as glass fibre and flakes, foaming or blowing agents, processing aids, anti-block agents, release agents, fusion aid, process aid, calcium carbonate, calcium stearate, titanium dioxide, stearic acid, paraffin wax, or combinations of two or more thereof.

The various layers in the multilayers system of the invention can have the same of different thickness depending on the application. Preferably the one or more polyolefin layers can have a thickness in the range of 10-300 µm, more preferably in the range of 10-200 µm, such as in the range of 10-100 µm. These thickness preferably indicate the thickness of each separate layer of polyolefin. The one or more polyvinyl chloride layers preferably have a thickness in the range of 10-300 µm, more preferably in the range of 10-200 µm, such as in the range of 10-100 µm. These thickness preferably indicate the thickness of each separate layer of polyvinyl chloride.

Depending on the application the amount of layers can vary. However, the minimum amount of layers in the multilayer system of the invention is one layer of polyolefin and one layer of polyvinylchloride. Typically, the amount of layers in the multilayer system can be in the range of 2-30, preferably 4-20, such as 4-16. It is advantageous if in the multilayer system of the invention the one or more polyvinyl chloride layers and the one or more polyolefin layers are arranged in alternating manner.

Multilayer systems can be produced by any methods known to the person skilled in the art. Compositions for the distinct layers can be prepared by standard mixing practices, either in a one-step or a multi-step process. Thereafter the multilayer system can be prepared using, for instance, a co-extrusion process. Such a co-extrusion process can be performed as a single-step method and is therefore economic and advantageous.

The multilayer system can also be prepared by lamination. Such a process includes preforming each of the plies and adhering them together by suitable heat and pressure, or, preforming the plies, coating one or more of the plies with adhesive by, e.g., a roll or dispersion technique, and then subjecting the formed laminate to suitable temperatures and pressures. Though these methods are satisfactory, simultaneous co-extrusion is usually less time consuming and less expensive.

The multilayer system of the invention can advantageously be comprised in an article. Such an article may have an advantageous elongation at break of 10% or more, such as in the range of 10-45%, preferably in the range of 20-45%, more preferably in the range of 25-45%.

The article of the invention can further have an advantageous tensile strength of 20 MPa or more, such as in the range of 20-40 MPa, or in the range of 22-35 MPa. The elongation at break and the tensile strength of a multilayer pipe can be measured in two ways. One way is to flatten the pipe section at moderately high temperature and then cut ASTM standards samples for tensile testing. Another way is to directly cut samples from the pipe section and take small errors on the results due to curvature for granted.

The article of the invention can desirably achieve a combination of high elongation at break and at the same time a high tensile strength. The high elongation at break is induced by the polyolefin component while the high tensile strength is induced by the polyvinylchloride component.

The article may have various shapes or forms. For example, the article can be in the form of a sheet, film, tube, pipe, or profile. In a preferred embodiment the multilayer system of the invention is used for preparing a pipe.

Hence, the article is preferably in the form of a pipe. In the case of a pipe, it is preferred that the layer facing the interior of pipe is a layer of polyvinylchloride.

The pipe can have a wall thickness in the range of 1000-10 000 µm, preferably in the range of 1000-5000 µm, more preferably in the range of 1000-3000 µm.

The multilayer system of the invention can, for instance, be used in packaging films where an improved oxygen and/or carbon dioxide barrier is required. Another application of the multilayer system of the invention is a multilayer piper with better barrier properties to methane or equivalent gases. Additionally, the multilayer system of the invention can be used for preparing multilayer pipes with improved chemical resistance.

The invention claimed is:

1. Multilayer system comprising
    a polyvinyl chloride layer, in contact with
    a polyolefin layer,
    wherein said polyvinyl chloride layer comprises a copolymer containing a moiety that is miscible with polyvinylchloride and an epoxy group, and
    wherein said polyolefin layer comprises polyolefin modified to have a carboxyl group.

2. Multilayer system according to claim 1, having alternating layers of said polyvinyl chloride layer and said polyolefin layer.

3. Multilayer system according to claim 1, wherein said moiety that is miscible with polyvinylchloride comprises one or more selected from a polymethylmethacrylate moiety, a nitrile butadiene rubber moiety, a polycaprolactone moiety, a polyethylene vinyl acetate moiety, and a poly(ethylene-vinylacetate-carbon monoxide)terpolymer moiety.

4. Multilayer system according to claim 1, wherein the epoxy group on the copolymer has undergone a ring-opening reaction with the carboxyl group on the modified polyolefin.

5. Multilayer system according to claim 1, wherein said polyolefin modified to have the carboxyl group is a modified polyethylene and/or modified polypropylene.

6. Multilayer system according to claim 1, further comprising a chlorinated polyolefin.

7. Multilayer system according to claim 1, wherein the polyolefin layer has a thickness in the range of 10-300 µm.

8. Multilayer system according to claim 1, wherein the polyvinyl chloride layer has a thickness in the range of 10-300 µm.

9. Multilayer system according to claim 1, wherein said polyolefin layer further comprises an unmodified polyolefin.

10. Multilayer system according to claim 9, wherein said polyolefin is selected from polyethylene and polypropylene.

11. Multilayer system according to claim 1, wherein said copolymer comprises one or more monomers selected from methyl acrylate, methyl methacrylate, ethyl acrylate, ethyl methacrylate, glycidyl acrylate, and glycidyl methacrylate.

12. Multilayer system according to claim 11, wherein said copolymer is a copolymer of methyl methacrylate, glycidyl methacrylate and ethyl acrylate, wherein said methyl methacrylate is present in an amount of 60-85 wt. % based on total weight of said copolymer, wherein said glycidyl methacrylate is present in an amount of 10-40 wt. % based on total weight of said copolymer, and wherein said ethyl acrylate is present in an amount of 1-5 wt. % based on total weight of said copolymer.

13. Multilayer system according to claim 1,
wherein said polyolefin modified to have the carboxyl group is a modified high density polyethylene and/or modified polypropylene; and
wherein the copolymer comprises a monomer selected from methyl methacrylate, glycidyl methacrylate, and ethyl acrylate.

14. Multilayer system according to claim 13, wherein said copolymer is a copolymer of methyl methacrylate, glycidyl methacrylate and ethyl acrylate, wherein said methyl methacrylate is present in an amount of 60-85 wt. % based on total weight of said copolymer, wherein said glycidyl methacrylate is present in an amount of 10-40 wt. % based on total weight of said copolymer, and wherein said ethyl acrylate is present in an amount of 1-5 wt. % based on total weight of said copolymer.

15. Multilayer system according to claim 13, wherein the polyolefin layer and the polyvinyl chloride layer have a thickness in the range of 10-200 μm.

16. Article comprising a multilayer system according to claim 1.

17. Article according to claim 16, wherein the multilayer system is in the form of a pipe having an interior, and wherein the layer facing the interior of the pipe is a layer of polyvinylchloride.

18. Article according to claim 16, wherein the pipe has a wall thickness in the range of 1000-10000 μm.

19. Multilayer system comprising
a polyvinyl chloride layer, in contact with
a polyolefin layer,
wherein said polyvinyl chloride layer comprises a copolymer containing a moiety that is miscible with polyvinylchloride and an epoxy group, said moiety selected from a polymethylmethacrylate moiety, a nitrile butadiene rubber moiety, a polycaprolactone moiety, a polyethylene vinyl acetate moiety, and a poly(ethylene-vinylacetate-carbon monoxide)terpolymer moiety,
and
wherein said polyolefin layer comprises a polyolefin modified to have a carboxyl group.

\* \* \* \* \*